United States Patent [19]

Hammerschmitt

[11] Patent Number: 5,151,185

[45] Date of Patent: Sep. 29, 1992

[54] LIGHT-LIQUID SEPARATOR

[76] Inventor: Nikolaus Hammerschmitt, Kölner Str. 138, D-5350 Eurkirchen, Fed. Rep. of Germany

[21] Appl. No.: 671,889

[22] PCT Filed: Jun. 5, 1990

[86] PCT No.: PCT/DE90/00429

§ 371 Date: Mar. 27, 1991

§ 102(e) Date: Mar. 27, 1991

[87] PCT Pub. No.: WO90/14874

PCT Pub. Date: Dec. 13, 1990

[30] Foreign Application Priority Data

Jun. 6, 1989 [DE] Fed. Rep. of Germany ....... 3918343
Jul. 26, 1989 [DE] Fed. Rep. of Germany ....... 3924787
Sep. 11, 1989 [DE] Fed. Rep. of Germany ....... 3930226

[51] Int. Cl.$^5$ .............................................. C02F 1/40
[52] U.S. Cl. .................. 210/521; 210/532.1; 210/540
[58] Field of Search ............ 210/256, 521, 522, 532.1, 210/538, 540

[56] References Cited

U.S. PATENT DOCUMENTS

| | | | |
|---|---|---|---|
| 1,200,951 | 10/1916 | Kelly, Jr. ............................ | 210/540 |
| 2,782,929 | 2/1957 | Colket ................................ | 210/540 |
| 3,731,802 | 5/1973 | James ................................. | 210/540 |
| 4,132,645 | 1/1979 | Bottomley et al. .................. | 210/540 |
| 4,390,421 | 6/1983 | Hammerschmitt ................... | 210/522 |
| 4,422,931 | 12/1983 | Wolde-Michael .................... | 210/540 |

FOREIGN PATENT DOCUMENTS

| | | |
|---|---|---|
| 201072 | 11/1982 | European Pat. Off. . |
| 308949 | 3/1989 | European Pat. Off. . |
| 3837638 | 5/1990 | Fed. Rep. of Germany . |
| 2481608 | 11/1981 | France . |

Primary Examiner—Stanley S. Silverman
Assistant Examiner—Christopher Upton
Attorney, Agent, or Firm—Herbert Dubno

[57] ABSTRACT

The present invention is directed to a light-liquid separator with an inlet for a light liquid/heavy liquid mixture at least one separator chamber for the light liquid from the heavy liquid located behind the inlet, a heavy liquid outlet located behind the separator chamber, an overflow edge being located in front of the heavy liquid outlet, a light liquid outlet including a light liquid balance room, a dip tube extending from a point below the overflow edge of the separator chamber downwardly into the light liquid balance room, and a light liquid discharge tube extending from the light liquid balance room upwardly, as well as a light liquid reservoir with which the light liquid discharge tube is in communication.

14 Claims, 9 Drawing Sheets

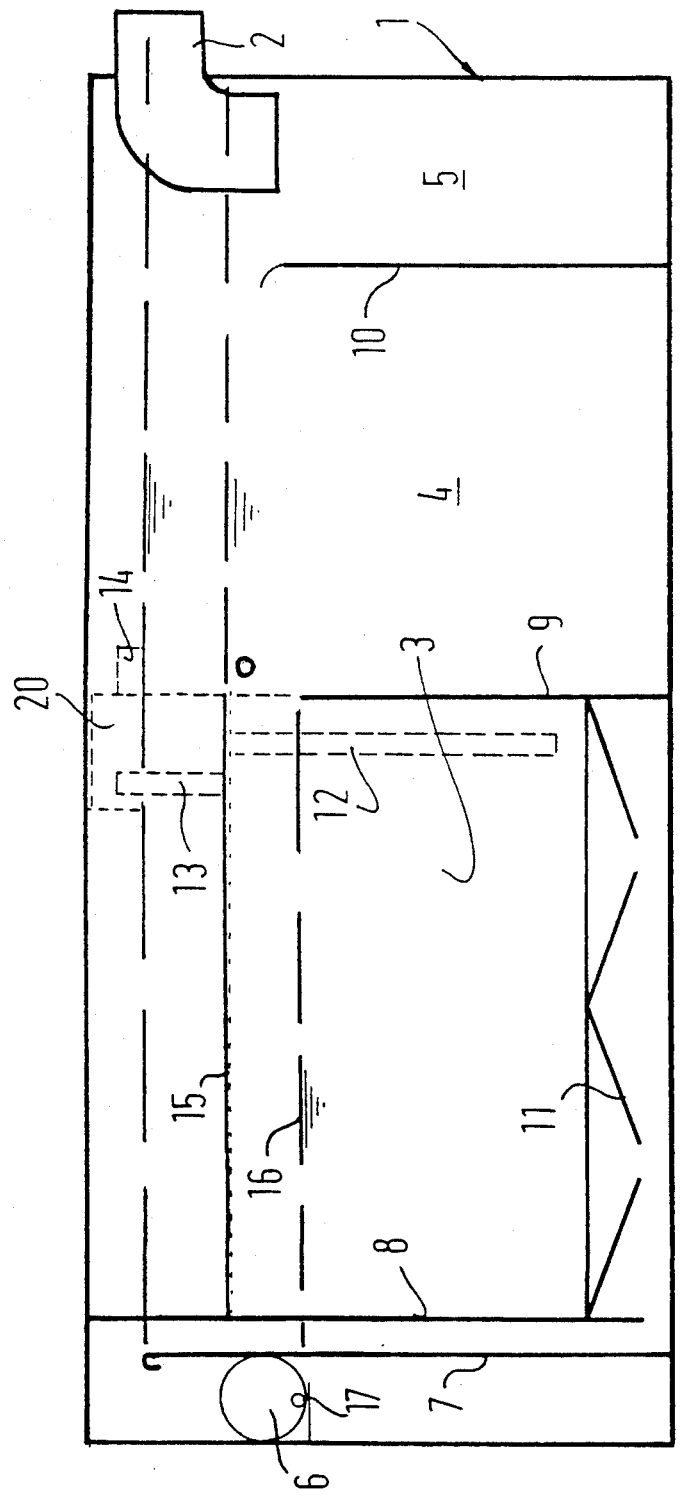
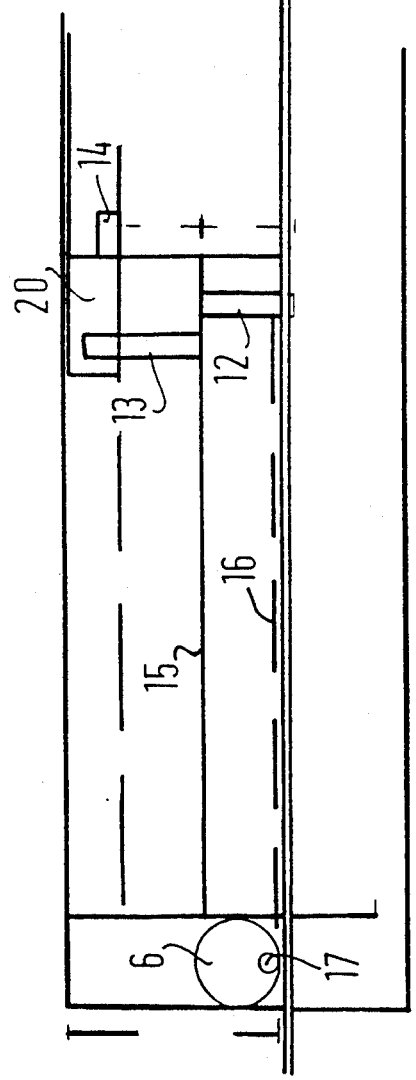
Fig.1
Fig.2

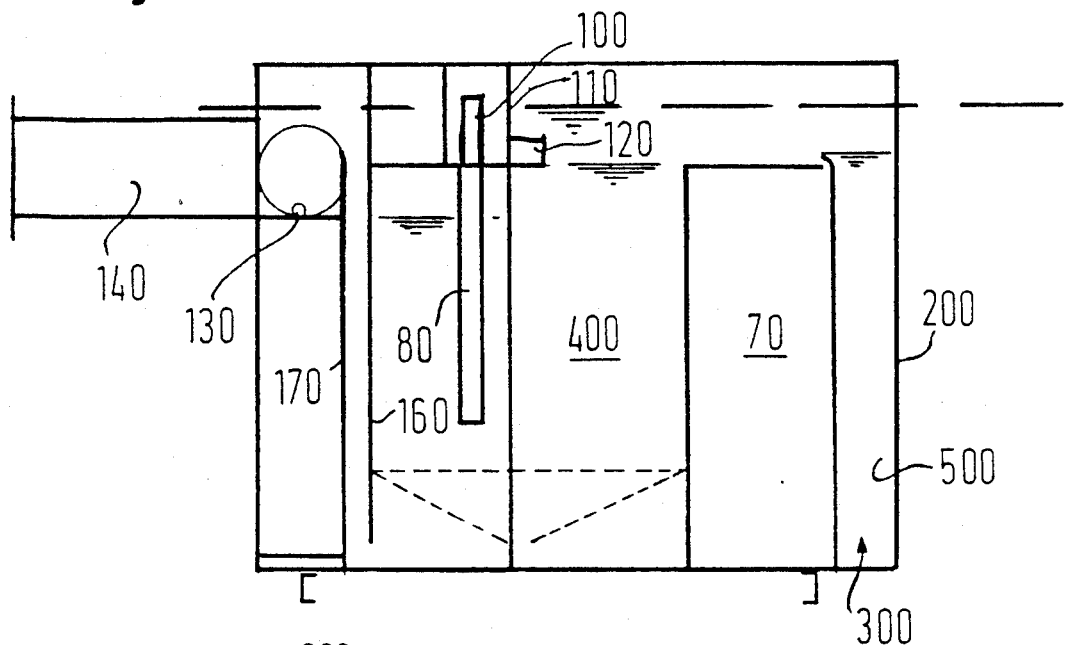

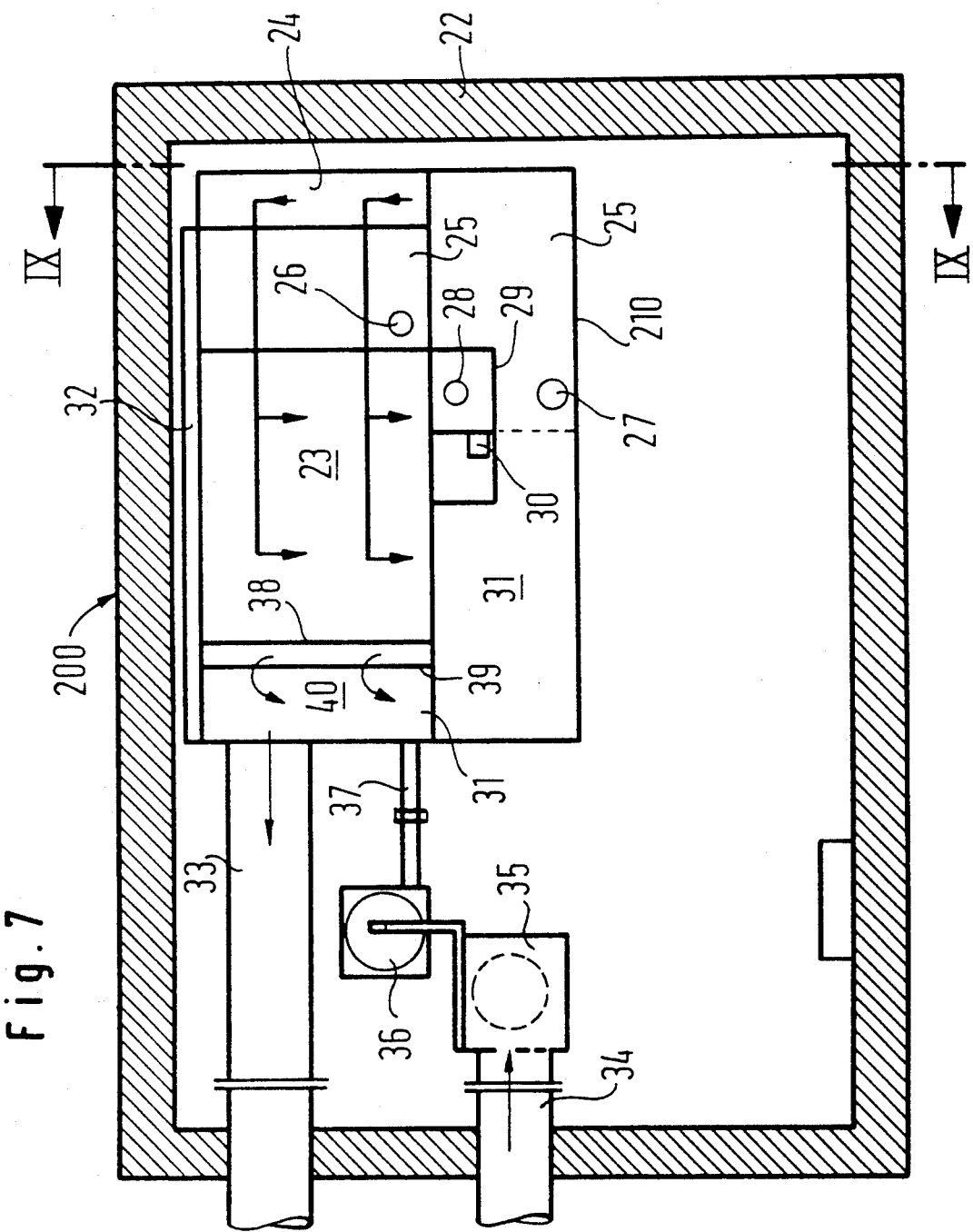

LIGHT-LIQUID SEPARATOR

CROSS REFERENCE TO RELATED APPLICATIONS

This is a National Phase application of PCT/DE90/00429 and based upon German national application P 39 18 343-2 filed Jun. 6 1989.

FIELD OF THE INVENTION

The present invention is directed to a light-liquid separator with an inlet for a light liquid/heavy liquid mixture and including a heavy liquid outlet provided with means for receiving the heavy liquid from a light liquid balance room.

BACKGROUND OF THE INVENTION

Such a light liquid separator is for instance known from EP 0 118 021 B1. According to this known separator the heavy liquid flows over the corresponding overflow wall into the heavy liquid outlet. A small flow opening is provided below the overflow edge of this overflow wall. This flow opening has the effect that the heavy liquid level drops further when the overflow edge of the overflow wall is reached and the flow of the inflowing mixture is stopped and, in the inoperative condition, adjusts itself at the level of the bottom of the flow opening. Upon corresponding inflow the heavy liquid level increases again so that the heavy liquid flows again over the overflow edge. Therefore, permanent heavy liquid level variations result which are utilized for the outflow of the light liquid.

If in the inoperative condition of the separator the heavy liquid level has reached its lowest level (bottom of the small flow opening), light liquid can still remain within the separator chamber which is removed only after a new inflow of mixture through the light liquid outlet.

Thus, a light-liquid separator which is especially effective with regard to the removal of light liquid from the separator chamber has not been provided yet.

OBJECTS OF THE INVENTION

Therefore the principle of the present invention is to provide a light-liquid separator avoiding drawbacks of the prior art.

Yet another object of the present invention is to provide the separator providing the complete removal of the light liquid during an inoperative stage corresponding to termination of the mixture supply.

SUMMARY OF THE INVENTION

With a light liquid separator of the above-cited art this problem is solved according to the invention by the feature that a small flow opening connecting the light liquid balance room with the heavy liquid outlet is provided between the bottom of the heavy liquid outlet and the upper edge of the dip tube.

Accordingly, in the inventive embodiment, the light liquid balance room is in connection with the heavy liquid outlet. The separator chamber itself has no small flow opening to the heavy liquid outlet, as is the case with the above-cited prior art. Accordingly, the lowest liquid level in the separator chamber is determined by the upper edge of the dip tube opening into the light liquid balance room. An undisplaceable room develops thereby. On account of the connection between the light liquid balance room and the heavy liquid outlet, heavy liquid flows from the light liquid balance room into the heavy liquid outlet until the bottom of the small flow opening is reached. Then, in the light liquid balance room a corresponding heavy liquid level adjusts which is located lower than the heavy liquid level in the real separator chamber. This level difference has the effect that the light liquid accumulating in the separator chamber when mixtures flowing in is forced through the downwardly extending dip tube into the light liquid balance room and is then directed to the light liquid reservoir through the light liquid outlet tube leading away from this room.

In detail, the separator has the following function:

In the inoperative condition of the separator the liquid level of the separator chamber has a level which is identical with the upper edge of the dip tube. The liquid level cannot sink more since the chamber has no outlet opening at a lower location. Furthermore, in the inoperative condition the liquid level within the light liquid balance room has a level which is identical with the bottom of the small flow opening. When mixture flows in a corresponding separation process takes place in the chamber having such a result that the light liquid ascends through the heavy liquid forming a light liquid layer on top of the heavy liquid. A direct outflow of the light liquid over the overflow edge of the overflow wall into the heavy liquid outlet is prevented by a dip wall located in front of the overflow wall, so that only heavy liquid can flow below the dip wall. The light liquid accumulating in the separator chamber is forced through the dip tube downwardly into the light liquid balance room by the corresponding difference of the heavy liquid level in the light liquid balance room and in the separator chamber. The light liquid flows through the heavy liquid in the light liquid balance room and over the light liquid outlet tube into the light liquid reservoir. This first operation phase, during which the heavy liquid flows over the overflow edge of the overflow wall, is terminated when the heavy liquid level reaches the overflow edge with decreasing inflow. In the second operation phase the heavy liquid level sinks further and continues to force light liquid through the dip tube into the light liquid balance room until the heavy liquid level of the separator chamber and the heavy liquid level in the light liquid balance room have again adapted to one another and the heavy liquid level in the separator chamber is in conformity with the upper edge of the dip tube. In this condition the whole light liquid column located in the separator chamber has been forced outwardly, therefrom through the dip tube. Now, the third operation phase starts during which the heavy liquid level sinks further on account of the connection through the small flow opening until the level of the bottom of the flow opening is reached. This heavy liquid level in the heavy liquid balance room corresponds to the inoperative condition of the separator.

According to the invention the distance between the upper edge of the dip tube and the bottom of the small flow opening is so dimensioned that the whole light liquid in the separator chamber is discharged into the light liquid balance room through the dip tube. Thereby, it is secured that no light liquid is left in the separator chamber upon each setting into operation of the light liquid separator so that a very fast discharge of the light liquid results, i. e. during each inflow phase the whole inflowing light liquid is removed from the separator chamber.

Accordingly, the upper edge of the dip tube extending into the light liquid balance room predetermines the heavy liquid level in the separator chamber in the inoperative condition.

In order to prevent that also light liquid leaves the light liquid balance room through the small flow opening and enters the heavy liquid outlet, according to an improvement of the invention, a dip wall is provided within the light liquid balance room in front of the small flow opening and forms a lower flow opening. The corresponding flow opening of the dip wall is located below the lower edge of the dip tube so that light liquid leaving the dip tube in no way can enter the flow opening.

Preferably, the upper edge of the dip tube is located below the bottom of the inlet. By this, back-rising of the water in the inlet in the inoperative condition of the separator is avoided.

According to an improvement of the invention the light liquid balance room is formed as a separate chamber located within the separator chamber. The dip tube emanates downwardly and the light liquid outlet tube emanates upwardly from the top wall of this chamber. The chamber forming the light liquid balance room is located at a side wall of the separator contiguous to a front wall of the heavy liquid outlet in which the small flow opening is provided. The upper side of the top wall of the chamber forming the light liquid balance room coincides with the upper edge of the dip tube so that the corresponding upper edge of the chamber determines the heavy liquid level in the separator chamber in the inoperative condition. When mixture flows in, the chamber is overflown, i. e. the whole width of the separator is used. The dip wall is spaced from the side wall of the separator so that it can be flown against from all sides. The location of the chamber at a side wall of the separator has the further advantage that a side wall of the separator can be simultaneously used as bordering wall of the chamber.

The light liquid storage means is preferably located behind the light liquid balance room in the flow direction of the mixture at the same side wall of the separator. Accordingly, the inner wall of the storage means and the inner wall of the chamber forming the light liquid balance room form a continuous wall without projections and recesses which has a favorable influence on the separation function.

Accordingly, in the inventive separator artificial heavy liquid level variations are generated which cause the corresponding discharge of light liquid without the necessity of using pumps, etc. According to the inventive embodiment these artificially generated heavy liquid level variations exclusively take place in the light liquid balance room while the complete available separation room is not concerned in that respect. There is rather present an undisplaceable space which is determined by the upper edge of the dip tube for the light liquid outlet or the upper edge of the top wall of the chamber forming the light liquid balance room which is located on the same level. The distance between the bottom of the small flow opening and this upper edge is dimensioned such that the whole light liquid amount is pressed out of the separation chamber on account of the difference in the heavy liquid level between the separation chamber and the light liquid balance room which is predetermined by the set distance.

Of course, the separator according to the invention can have several separation chambers. These chambers can be located upstream or downstream of the separation chamber which is connected to the dip tube. Preferably, they are located upstream of this separation chamber and are formed with the corresponding partitions terminating between the separation chambers below the upper edge of the dip tube so that the rising light liquid is discharged through the dip tube simultaneously from these further separation chambers. Accordingly, the additional chambers are completely integrated into the separation process. The invention provides especially that the separator has an integrated sludge chamber, i. e. the sludge chamber is simultaneously used as separation chamber, wherein the oil rising in the sludge chamber is also discharged through the dip tube. The sludge chamber can be divided into a coarse sludge chamber and a fine sludge chamber by means of a partition wall or an overflow wall. According to this embodiment, the overflow wall terminates between the fine sludge chamber and the real separation chamber preferably at a level of the bottom of the small flow opening.

Advantageously, an overflow wall is located behind the inlet. The overflow edge of the overflow wall is located below the upper edge of both the dip tube and the inlet bottom. By doing this, the room located upstream of the overflow wall is integrated into the separation process since the rising light liquid can freely flow to the inlet opening of the dip tube. For instance, this room can be used as coarse sludge chamber.

According to the above-described embodiments the light liquid is discharged exclusively below the heavy liquid level of the separator chamber. Pump effects promoting the light liquid discharge are generated by the heavy liquid level lowerings in the light liquid balance room. Since the upper edge of the dip tube is located lower than the overflow edge in front of the heavy liquid outlet, an undisplaceable space below the dip tube upper edge in the separation chamber is generated. In the dip tube itself the heavy liquid level sinks to the necessary depth on account of the connection between the light liquid balance room and the heavy liquid outlet. Decisive for the depth is the value of the density of the respective light liquid and the volume which has to be taken up. If the lowest density is taken as a basis for the lowering, the light liquid outlet operates at all higher densities. At each inoperative condition the heavy liquid level sinks to the predetermined depth in the balance room. Since the lower end of the dip tube terminates in the balance room, the light liquid swims up and flows over the lower end of the dip tube into the balance room. Accordingly, the separator is practically light liquid free at each start-up.

The above-described separator can have one or more separation chambers. However, if several separation chambers are provided the same have always a common liquid level which is determined by the upper edge of the single dip tube extending into the light liquid balance room in the inoperative condition of the separator. Accordingly, in accordance with a corresponding inflow the liquid mixture can be spreaded over all the separation chambers, and the liquid level extending over all the separation chambers is lowered either by the correspondig outflow.

A further embodiment of the invention, which is especially effective with regard to the removal of the light liquid from the separation chamber and which makes necessary service efforts insignificant, is characterized in that the separation chamber is located in a pre-separation room, into which the inlet opens, in such a manner that the light liquid layers forming in both ranges are separated from one another, and that a dip tube leads into the light liquid balance room not only from the separation chamber but also from the pre-separation room. Accordingly, in accordance with this solution a pre-separation room separated from the separation chamber (apart from the inlet opening into the separation chamber from the pre-separation room) is provided, and both regions have light liquid discharge means separated from one another which lead to a common light liquid balance room or to several light liquid balance rooms which are connected with one another. From the light liquid balance room the light liquid is fed over a light liquid discharge tube into a light liquid storage means in the manner described in the above-cited patent application. This solution has the advantage that already in the pre-separation room a separation between light liquid and heavy liquid can take place so that the true separation chamber is correspondingly unburdened. Here, a direct discharge from the pre-separation room into the light liquid balance room is realized so that the predominant portion of the light liquid to be discharged has not to pass through the real separation chamber. This improves the effectiveness of the separator and lowers its service efforts since the real separation chamber is loaded with light liquid in a simpler manner than the one according to the previously described solution. Consequently, the separation chambers as well as the members located therein, can be cleaned in longer intervals.

The separator has the following made of operations:

In the inoperative condition of the separator the liquid in the pre-separation room and in the separation chamber has a level which coincides with the upper edge of the respective dip tube. The liquid level cannot drop further since not only the chamber out also the pre-separation room does not have any outlet opening at a lower position (apart froma closed discharge opening). In this inoperative condition the liquid level in the pre-separation is free from light liquid. Furthermore, in the inoperative condition the liquid within the light liquid balance room has a level coinciding with the bottom of the small flow opening. When mixture flows in, the liquid which is still in the dip tube associated with the pre-separation room, is pressed into the light liquid balance room by the corresponding heavy liquid. The light liquid flowing in with the mixture accumulates in the pre-separation room on top the heavy liquid layer. A part of the mixture enters into the separation chamber. Since the corresponding inlet for the separation chamber is located very low in the pre-separation room the light liquid layer which is formed in the pre-separation room is not influenced, and only a small amount of light liquid is introduced into the separation chamber. Here, the remaining light liquid accumulates on the respective heavy liquid layer either. The light liquid which is still in the dip tube associated with the separation chamber is pressed into the light liquid balance room by the heavy liquid. Anyway, the complete heavy liquid flows successively into the separation chamber since no special heavy liquid outlet is located in the pre-separation room and the heavy liquid has to pass the separation chamber in any case in order to reach the heavy liquid outlet located behind the same. A direct outflow of the light liquid from the separation chamber over the overflow edge of the overflow wall into the heavy liquid outlet is prevented by a dip wall located in front of the overflow wall so that only heavy liquid can underflow the dip wall.

After termination of the inflow of the mixture the heavy liquid level with the light liquid layer located thereabove drops in the pre-separation room and in the separation chamber since a connection exists between the light liquid balance room and the heavy liquid outlet by means of the small flow opening. As soon as the light liquid layer reaches the upper edge of the dip tubes, the heavy liquid which is in the dip tubes will be pressed out of the same into the light liquid balance room. Thereafter, the light liquid layer enters the light liquid balance room through the dip tubes. This process terminates as soon as the heavy liquid levels in the pre-separation room, in the separation chamber and in the light liquid balance room have approximated and the heavy liquid levels in the pre-separation room and in the separation chamber coincide with the upper edges of the dip tubes. In this condition the total light liquid column in the pre-separation room and in the separation chamber has been pressed out of the same by means of the dip tubes. Then the heavy liquid level in the light liquid balance room drops further due to the connection through the small flow opening until the level of the bottom of the flow opening is reached. This heavy liquid level in the light liquid balance room corresponds to the inoperative condition of the separator.

The upper edges of the two dip tubes are located generally lower than the edge of the overflow wall associated with the heavy liquid outlet. However, the upper edges can be also at the same level. It is obvious that with the above-cited function the major part of the light liquid is already discharged from the pre-separator room by means of the corresponding dip tube into the light liquid balance room and thus into the reservoir while mainly heavy liquid flows into the true separator chamber wherein this heavy liquid carries along only a low light liquid portion (below 1%). In this manner, overloading of the separator chamber with a high light liquid portion is prevented.

Preferably, the separator chamber is located in a container containing the light liquid outlet and the heavy liquid outlet with overflow wall and disposed in the pre-separator room. According to this embodiment all the constituents of the real separator chamber and of the light liquid outlet including light liquid balance room, dip tubes, light liquid discharge tube and possibly light liquid reservoir as well as the heavy liquid outlet with overflow wall and the small flow opening are integrated in a container which is located in the pre-separator room. The pre-separator room is formed correspondingly larger than this container so that enough space is left in order to carry out the above-described process of separation as well as the discharge of the light liquid layer by means of the corresponding dip tube. The container is located in such a manner in the pre-separator room that its bottom is spaced from the bottom of the pre-separator room, and the inflow of the separator chamber of the container is realized from below from the pre-separator room. By this, it is secured that as little as possible of light liquid is carried along into the separator chamber since heavy liquid accumulates in the lower part of the pre-separator room. Furthermore, the path of the inflow into the separator chamber is substantially shortened in contrast to the embodiments of the prior art according to which the inflow is above and a deflection downwardly and then again upwardly takes place.

The inflow of the mixture from outside is preferably realized by means of a tube opening into the upper portion of the pre-separator room. The inlet of the separator chamber is preferably located in the opposite portion of the pre-separator room so that the mixture has to pass a relatively large distance until it flows into the separator chamber which favours a corresponding pre-separation. Appropriately, the inlet into the pre-separator room is formed as bent tube which is first directed horizontally and then directed downwardly. Hereby it is assured that the inflowing mixture does not interfere with the light liquid layer accumulating above.

The inlet into the separator chamber is preferably structured such that the separator chamber has an opening in its bottom extending over its width as well as a following passage with overflow wall. The separator chamber is flown against over the whole width so that a uniform passage is guaranteed. By the upward flow along the passage and the following downward flow through the separator chamber the last light liquid portions are separated from the heavy liquid, so that an optimal separation effect is obtained. This effect can be improved by an inclined plane located on the bottom of the separator chamber or by packings in the separator chamber. The fact that the inlet emanates from the lower portion of the pre-separator room the light liquid layer formed in the pre-separator room is not carried along into the separator chamber.

In order to obtain a corresponding separation of the separator chamber from the pre-separator room the bordering walls of the separator chamber are made so high that they cannot be overflown by the mixture flowing into the pre-separator room. Preferably, the real separator chamber or the container receiving the same is provided with a cover wall.

It is recommended to design the container receiving the separator chamber as well as the remaining parts as steel construction which is located in a container made of concrete and forming the pre-separator room. The support of the steel container in the concrete container is realized by suitable beams which guarantee that the container is adapted to be underflown by heavy liquid and that the inflow into the real separator chamber can take place from below. The pre-separator room is preferably formed as a sludge chamber and has the means necessary herefor. By this arrangement a sludge chamber which has to be located remote from a separator is no more necessary.

According to another embodiment of the invention the light liquid balance room is divided into a plurality of sectional chambers which are located in the container receiving the separator chamber and which are especially disposed downstream of the inlet of the separator chamber with overflowing by the mixture as well as below the heavy liquid outlet bottom downstream of the overflow wall associated with the heavy liquid outlet. This makes it possible to form the light liquid balance room as large as possible in order to obtain a very fast urging of the light liquid into the corresponding reservoir. This is possible without having to enlarge the container. Otherwise the portion located below the heavy liquid outlet bottom could not be utilized. The portion located downstream of the separator chamber inlet having a bordering wall formed by the passage wall of the inlet is overflown by the inflowing mixture so that hereby the desired flow characteristic of the inflowing mixture is obtained. Obviously, a part of the light liquid balance room should be located adjacent to the heavy liquid outlet bottom in order to reach the corresponding effect by means of the small flow opening since otherwise corresponding tube connections would have to be provided. This part is connected to the other sectional chambers of the light liquid balance room by means of corresponding channels, passages etc. The light liquid discharge tube extending upwardly from the light liquid balance room opens appropriately into a reception box located thereabove. The box has a supply line to the light liquid reservoir. The light liquid reservoir is preferably located laterally with regard to the real separator chamber.

In order to achieve the above-mentioned direct connection from the pre-separator room into the light liquid balance room by means of a dip tube, according to a special embodiment at least a part of the light liquid balance room projects laterally from the container and has a closed upper wall from which the dip tube associated with the pre-separator room extends downwardly. Accordingly, this part of the container is dipped completely into the light liquid/heavy liquid mixture in the pre-separator room. According to a preferred embodiment the dip tube associated with the separator chamber is located within a bulged portion of the separator chamber which is located above the upper wall of the light liquid balance room. Accordingly, in this embodiment the separator chamber covers in the range of the bulged portion the light liquid balance room located thereunder. Hereby, a fail-safe discharge of liquid into the light liquid discharge room is guaranteed.

The embodiments which were described last differ from the embodiments described above by the inflow from below and the simultaneous separation of the light liquid outlet and the surface of the separator (pre-separator room and real separator chamber). The pre-separator room (sludge chamber) is located below and the real separator chamber is located thereabove. If the pre-separator room is used as sludge chamber, especially little sludge is introduced into the sewage system and up to 99% of the light liquid is introduced into the light liquid reservoir already prior to the real separator chamber. This relief of the real separator chamber is an especially great advantage.

By means of the specific inlet inlet turbulences are already calmed down before the pre-separator room, and the inflow is distributed over the whole width. The sludge remains in the pre-separator room and can be removed without having to discharge the complete unit. Already here the light liquid passes into the light liquid reservoir without going through the real separator. Furthermore, the backflow of the light liquid layer accumulated during the operation into the inlet is safely prevented (undisplaceable space).

If the pre-separator room is used as the sludge chamber, it is located off from the passage zone which cannot be renounced and thus in the totally calmed range. The sedimentation of the fine sludge and the ascending of light liquid still present are optimally promoted. On account of the separation of the sludge chamber surface and the separator surface a respective dip tube is necessary for each surface for the light liquid outlet in the calm condition. These dip tubes deflect the light liquid into the common light liquid balance container, as described above. The light liquid can be already considered as discharged in this balance container since it is urged into the light liquid reservoir during the next operation step, i.e. upon ascending heavy liquid level, and thus has no more any connection with the heavy liquid flowing through. In contrast to this, according to conventional separators the stored light liquid is still on the heavy liquid flowing through.

According to still another embodiment the inlet into the pre-separator room (sludge chamber inlet) is formed as multi-purpose pre-room and begins approximately above the heavy liquid level in the calm condition and extends to the bottom of the complete unit. The mixture stream directed downwardly by a pipe bend or an inlet closure reverses halfway and flows on both sides of the inlet bend to an overflow edge of the multi-purpose pre-room. By doing so heavier particles deposit in the pre-room while lighter particles are supported in their bouyancy. When the overflow edge is reached a velocity stop occurs. With the light liquid etc. a centrifugal effect occurs. Only such constituents which are no more bound by the light liquid layer deposit in the extremely calmed sludge chamber. The downwardly opened inlet opening to the real separator chamber is located on the borderline separator/sludge chamber. Only constituents of light liquid or of light substances can be introduced into this opening. According to experience this is only about 1-2%.

According to a further embodiment of the invention an additional sink dip tube is provided which serves as a safeguard means for extremely large amounts of inflowing light liquid (oil accident). With the above-described embodiments the length of the dip tube of the lowering of the heavy liquid level and the corresponding depth of the dip tube in connection with the bottom area of the light liquid balance container are decisive for the reception volume in the balance container at each inoperative condition. The size of this balance container can be selected in a manner that it is sufficient for each possible case. Nevertheless, in order to prevent unexpected inflows of light liquids, an additional sink dip tube is provided for the heavy liquid level lowering which is prolonged downwardly so far that inflowing light liquid can never reach the dip tube depth. This is achieved by keeping the light liquid column over the heavy liquid level at such a distance that the light liquid cannot displace the heavy liquid up to this depth. The prolongation of the sink dip tube is made into the pre-separator room (sludge chamber), preferably in a larger dimensioned tube which extends from the light liquid balance container, and extends preferably to a point which is immediately above the bottom of the sludge chamber.

BRIEF DESCRIPTION OF THE DRAWING

The above and other objects, features and advantages of my invention will become more readily apparent from the following description, reference being made to the accompanying highly diagrammatic drawing in which:

FIG. 1 is a vertical section of a light liquid separator according to a first embodiment of the present invention;

FIG. 2 shows a partial sectional view of the separator along line 2—2 in FIG. 3;

FIG. 5 is a diagrammatic vertical view of a further embodiment of light-liquid separator wherein the preseparator room is not shown;

FIG. 6 is a top view of the separator shown in FIG. 5;

FIG. 7 is a top view of a third embodiment of light-liquid according to the present invention;

SPECIFIC DESCRIPTION

Figure 3:
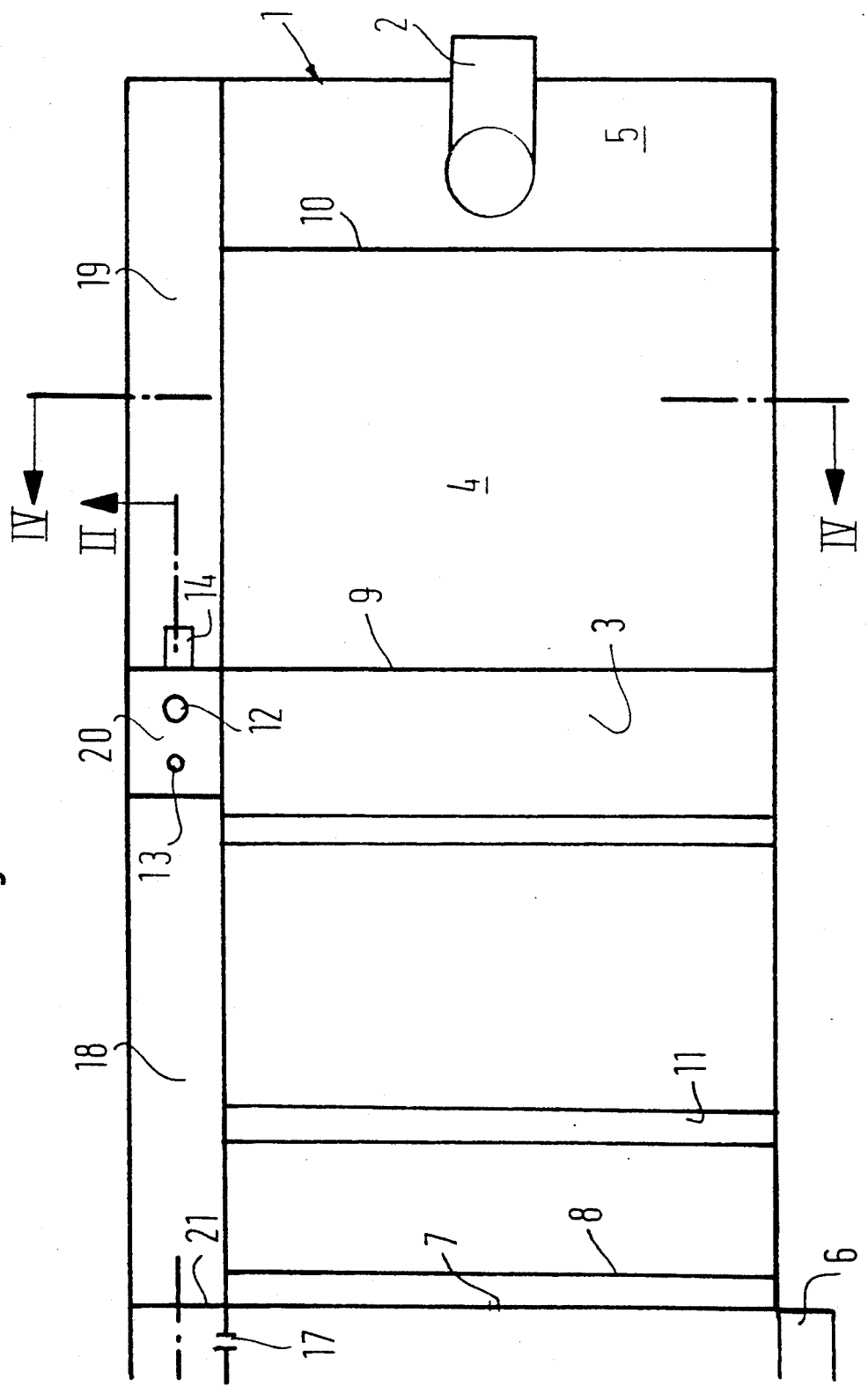
FIG. 3 is a top view of the light liquid separator according to the first embodiment shown in FIG. 1.
Figure 4:
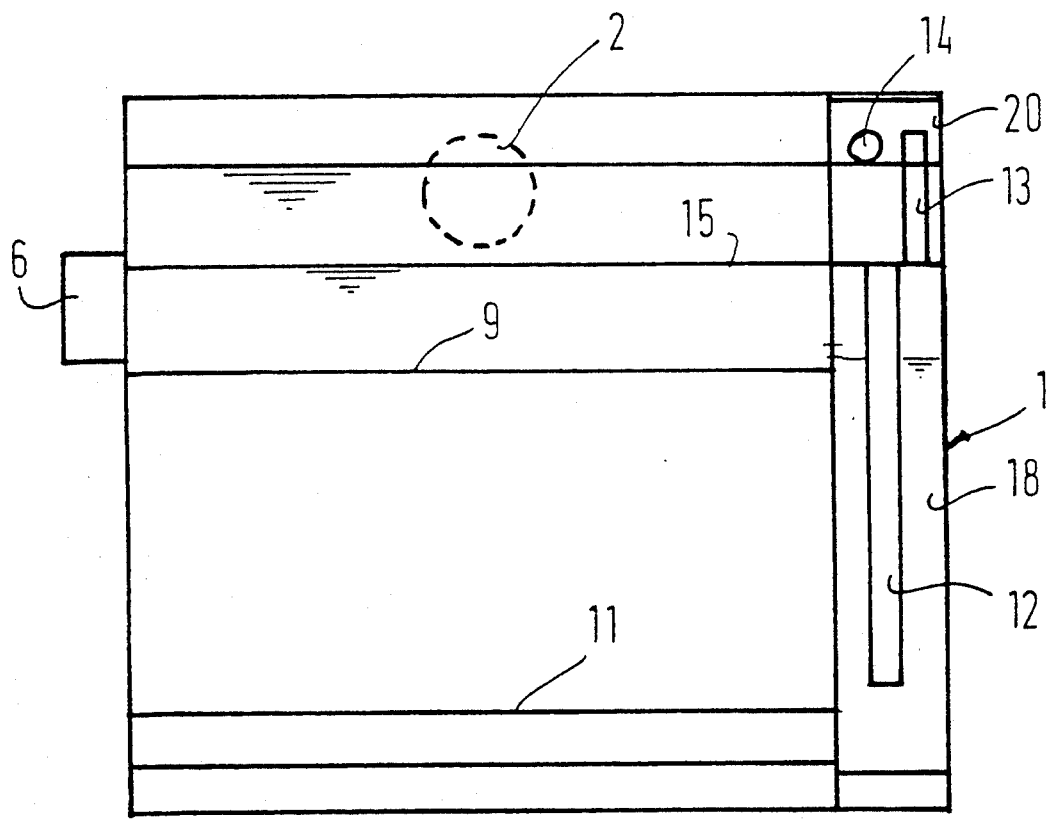
FIG. 4 is a sectional view of the separator along line 4—4 in FIG. 3.

The separator shown in the figures serves for the separation of a light liquid from a heavy liquid, especially oil or gasoline from the water. The separator is a gravity separator, and it can contain corresponding packings for the support of the separation process.

According to the embodiment shown in FIGS. 1 through 4 the separator has a box-like shape and the base of a rectangle. However, this does not exclude other embodiments, for instance round embodiments.

As the figures show, the light liquid separator 1 has an inlet 2 for a mixture of light liquid and heavy liquid. The inlet has the shape of a downwardly curved pipe. It opens into a first separator chamber which is a coarse sludge chamber 5. According to this embodiment the sludge chamber is integrated into the separator so that no separate sludge chamber has to be provided. An overflow wall 10 extending transversely through the separator separates the coarse sludge chamber 5 from a second separator chamber which is formed as fine sludge chamber 4. The fine sludge chamber 4 is followed by a third separator chamber which is only designated separator chamber 3 in the following specification. This separator chamber is separated from the fine sludge chamber 4 by an overflow wall 9 extending transversely through the separator. The overflow wall 9 is lower than the overflow wall 10.

At its bottom the separator chamber 3 has two inclined planes 11 which are inclined towards two sides and which can be formed as insert bottoms. In the middle of the respective inclined planes outlet openings for the heavy liquid are located which extend transversely over the width of the separator. From there the heavy liquid passes through a flow opening at the lower edge of a dip wall 8 confining the separator chamber at the rear and over the overflow edge of an overflow wall 7 into a heavy liquid outlet 6 which is laterally disposed at the separator.

According to the embodiment which is shown and described here, in all of the three separator chambers, i.e. in the coarse sludge chamber 5 and in the fine sludge chamber 4, as well as in chamber 3 a process of separation takes place. In this process of separation the light liquid separates from the heavy liquid on account of its lower specific weight. As a result of an effect described in the following the light liquid flows to the inlet opening of a dip tube 12 which opens from the separator chamber 3 to a light liquid balance room 18 (shown in FIG. 3). The light liquid leaves the dip tube at the lower end thereof and ascends in the light liquid balance room 18 and passes through a light liquid discharge tube 13 into a small chamber 20 and from there through a further tube 14 into a light liquid reservoir 19 (shown in FIG. 3). The light liquid is stored in the reservoir and can be discharged in certain intervals.

The above-mentioned effect of the downwardly directed discharge of the light liquid through the dip tube is based on the following:

In the rest condition of the separator when no mixture flows in, the heavy liquid level in the separator chamber 3 or the fine sludge chamber 4 and the coarse sludge chamber 5 is at the level of the upper edge of the dip tube or the upper edge of the cover wall of a chamber forming the light liquid balance room 18, as shown at 15. The level adjusts there since the separator chamber has no outlet opening therebelow (apart from a closed drain opening). Accordingly, the corresponding space of the separator chamber is undisplaceable.

However, in the rest condition the heavy liquid level within the light liquid balance room 18 adjusts lower than the heavy liquid level in the separator chamber since the light liquid balance room 18 is connected to the heavy liquid outlet 6 by means of a small flow opening 17. Accordingly, here the heavy liquid level shown at 16 adjusts which is identical with the bottom of the flow opening 17. So, in the rest condition a difference between the heavy liquid level in the separator chamber and the heavy liquid level in the light liquid balance room is present. At the beginning of the operation of the separator, i.e. when mixture flows in, this heavy liquid level difference has the effect that the light liquid column forming in the separator chamber, the fine sludge chamber and the coarse sludge chamber is pressed into the light liquid balance room 18 by means of the dip tube 12 and from there to the light liquid reservoir 19 by means of the ascending pipe 13, the chamber 20 and the tube 14. The heavy liquid level difference, i.e. the distance between the upper edge of the dip tube 12 and the bottom of the small flow opening 17, is dimensioned such that no light liquid is left in the separator chamber 3, the fine sludge chamber 4 and the coarse sludge chamber 5 at the termination of the inflow, i.e. the whole light liquid has been discharged through the dip tube 12. Accordingly, when the operation of the separator is started no light liquid remains in the separator chambers.

According to a corresponding model the distance between the bottom of the small flow opening and the upper edge of the dip tube was 22 mm, and the dip tube had a total length of 10.7 cm. Hereby, it is guaranteed that light liquid of a specific weight of 0.78 g/cm$^3$ and above is discharged.

FIG. 3 shows that the light liquid balance room 18 as well as the light liquid reservoir 19 are located one behind the other at a side wall of the separator so that a plane inner wall results confining the separator chamber or the separator chambers. In order to prevent that light liquid from the light liquid balance room 18 is also fed into the heavy liquid outlet 6 by means of the small flow opening 17 a dip wall 21 is provided within the light liquid balance room 18 in front of the small flow opening 17. This dip wall 21 forms a lower flow opening.

FIGS. 5 and 6 show a second embodiment of a light liquid separator. This light liquid separator comprise a container 200 into which a light liquid separator chamber 400, a light liquid outlet and a heavy liquid outlet are integrated. The container is based on mounting members 300 by means of which it is disposed within a larger concrete container (not shown) which houses a pre-separator room.

As clearly shown in FIG. 6, the inlet for the heavy liquid/light liquid mixture (preferably water/oil mixture) which has to be separated includes an angle pipe 150 which directs the mixture downwardly into the pre-separator room. The mixture flows around and below the container 200 which is disposed in the portion of the pre-separator room opposite to the inlet 150 in a manner that a sufficient distance remains between the bottom of the pre-separator room and the bottom of the container 200 which allows that the container is flown against from below.

The container has a substantially box-like shape and a generally rectangular base. It includes an inlet passage 500 which is open below and which is confined by an overflow wall. A room 70 forming a part of the light liquid reservoir extends at the overflow wall.

A separator chamber 400 is located downstream of this room. In the bottom range of the separator chamber 400 an inclined plane (shown with dotted lines) is located. A flow opening for the heavy liquid is disposed in the middle of the inclined plane. Thereafter, the heavy liquid flows under a dip wall 160 and over an overflow wall 170 until it reaches an outlet and from there into an outlet pipe 140 extending through the pre-separator room and discharging the heavy liquid to the sewage system.

According to this embodiment the above-cited light liquid balance room consists of two chambers 600 which are disposed behind the separator chamber 400 below the outlet bottom as well as substantially laterally from the separator chamber 400. These chambers are connected with one another by means of suitable pipes or passages (not shown). The laterally disposed chamber of the light liquid balance room is closed on the top by a cover wall in which a downwardly extending dip tube 90 is disposed. Accordingly, this dip tube extends from the pre-separator room to the light liquid balance room. Furthermore, the chamber 600 is connected to a further dip tube 80 which opens from the separator chamber 400 into the light liquid balance room. This dip tube is disposed in a bulged portion of the separator chamber extending over the chamber 600.

A light liquid discharge tube 100 extends from the light liquid balance room upwardly into a box 110 from which a discharge tube 120 opens into another part of the light liquid reservoir 70. The light liquid balance room 600 is connected to this heavy liquid outlet by means of a small flow opening 130 disposed at the bottom of the heavy liquid outlet.

The separator operates in the following manner:

In the rest condition of the separator the liquid level in the pre-separator room adjusts at the upper edge of the dip tube 90 while the liquid level in the separator chamber 400 adjusts at the upper edge of the dip tube 80. The liquid level in the light liquid balance room 600 is at the bottom of the small flow opening 130. When the mixture flows in, it arrives at the pre-separator room by means of the inlet 150. There, the light liquid accumulates on the heavy liquid. The light liquid which is still in the dip tube 90 is pressed into the light liquid balance room 600 by the inflowing heavy liquid. A part of the mixture which is heavy liquid to the major part passes also through the inlet passage 500 into the separator chamber 400. There, the light liquid also accumulates on the heavy liquid, and the light liquid in the dip tube 80 is pressed into the light liquid balance room 600.

If the inflow of mixture stops, the heavy liquid level with the light liquid layer thereabove descends not only in the pre-separator room but also in the separator chamber. As soon as the light liquid layer reaches the upper edge of the dip tubes the heavy liquid in the dip tubes will be pressed out of the tubes and the entire light liquid layer drains off into the light liquid balance room by means of the dip tubes.

This takes place as long as the heavy liquid levels in the pre-separator room and the separator chamber have reached the level of the upper edge of the two dip tubes 80, 90. Further descending is not possible since the corresponding rooms do not have any drain opening located at a lower level. However, in the light liquid balance room the level still descends to the level of the bottom of the small flow opening 130 since here heavy liquid is still drained off into the discharge tube 140 by means of this flow opening. A dip wall located in front of the small flow opening prevents the emergence of light liquid from the light liquid balance room by means of the small flow opening.

According to this embodiment the greatest part of the light liquid is already separated in the pre-separator room and is pressed into the light liquid balance room by means of the dip tube 90. Only a small part passes together with the heavy liquid the true separator chamber 400 so that the same remains largely free of light liquid and, on the whole, an improved separation process with smaller service requirements of the separation chamber results.

According to the embodiment shown here the light liquid balance room has two chambers 600. However, it can be also divided differently so that another number of chambers results or it can include a single chamber. Also the location of the chambers can be different from the example shown here.

It is of essential importance that the confining walls of the separator chamber 400 are formed so high that the liquid level forming therein is separated from the liquid level in the pre-separator room and the single connection therebetween is realized by the vertical inlet passage 500 as well as the corresponding light liquid balance room.

Figure 8:
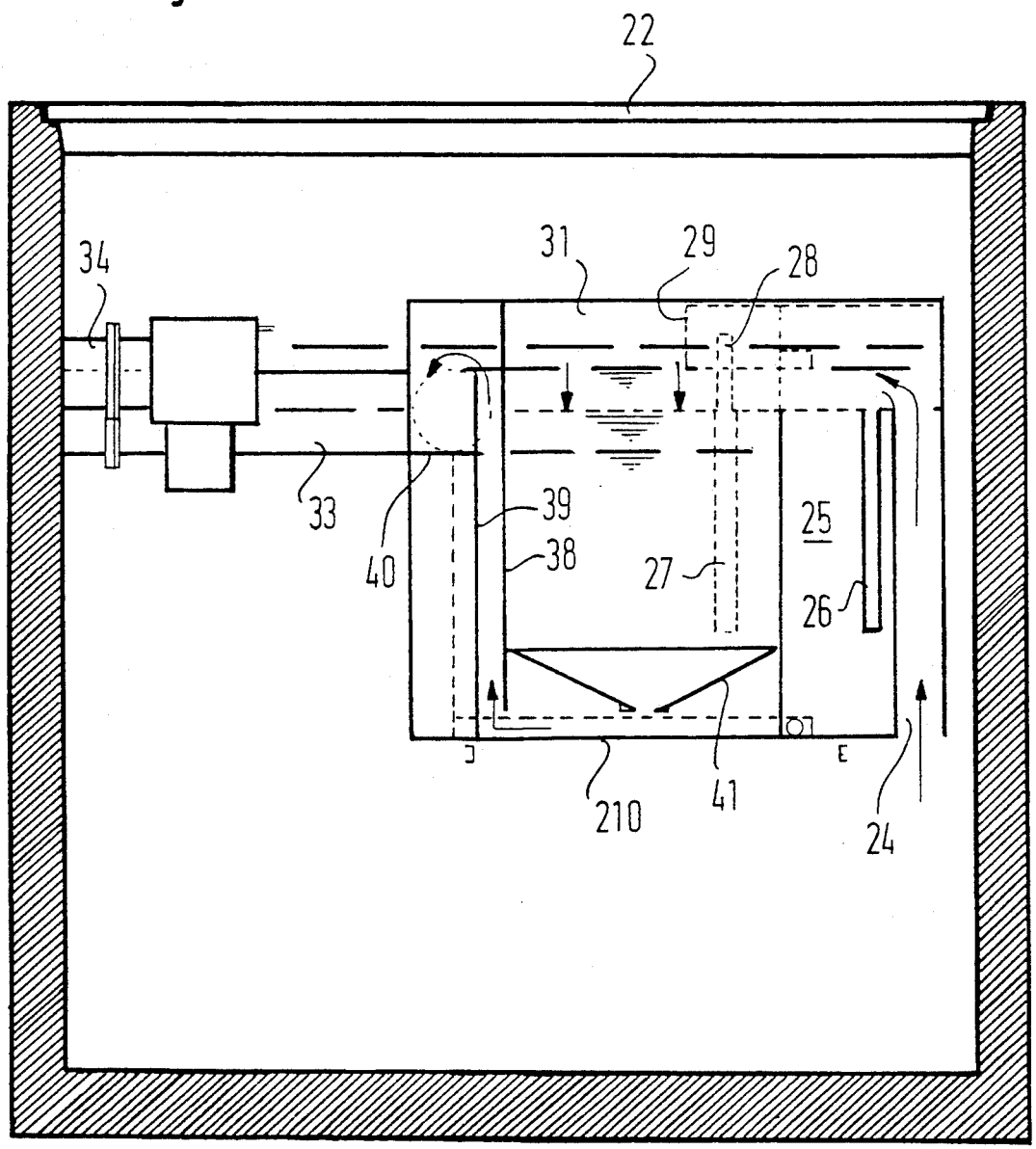
FIG. 8 is a vertical view of the separator of FIG. 7.
Figure 9:
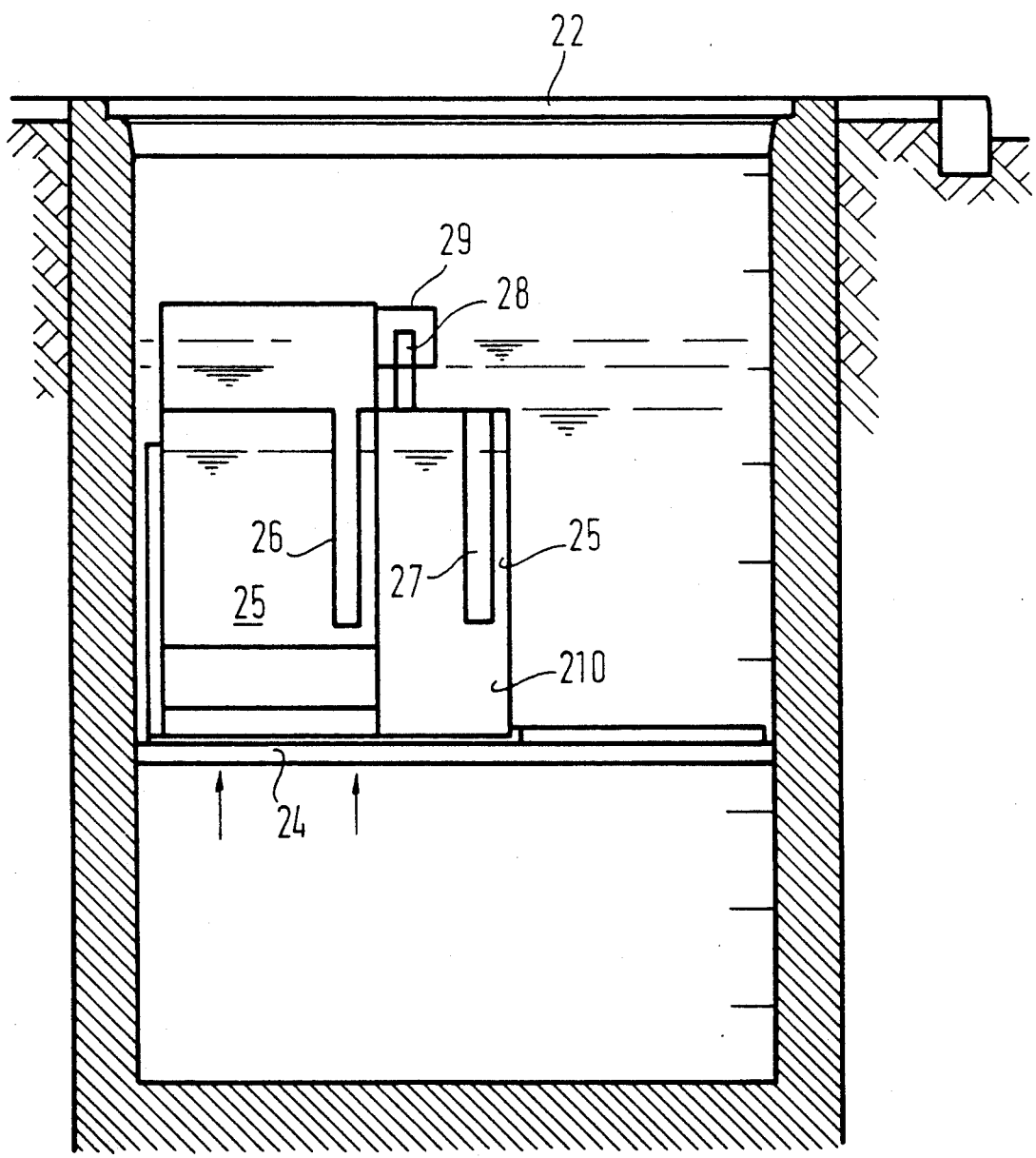
FIG. 9 is a cross-sectional view along lines 9—9 of the separator shown in FIG. 7.

FIGS. 7 to 9 show a third embodiment of a light liquid separator 200 according to which a container 210 having a separator chamber 23 is located within a concrete container 22 provided with a pre-separator room. The container 210 is disposed in the container 22 in such a manner that it is spaced from the bottom thereof correspondingly and mixture can flow against the same from below. The mixture passes through an inlet pipe 34 and an inlet closure 35 downwardly into the pre-separator room. There, a separation between light liquid and heavy liquid takes place in the same manner as with the above-described embodiment. The light liquid flows directly into a light liquid balance room 25 by means of a dip tube 27. This light liquid balance room consists of two chambers connected with one another and disposed in the container 210. The largely demixed heavy liquid flows into the container 210 including the separator chamber 23 by means of a vertical inlet passage 24 and flows over a chamber 25 of the light liquid balance room. It flows into the separator chamber 23 wherein the remaining separation process takes place. From this chamber a dip tube 26 extends into the overflown chamber 25 of the light liquid balance room. An upwardly extending light liquid discharge tube 28 feeds the light liquid through a box 29 into a light liquid reservoir 31 laterally disposed from the separator chamber 23. The heavy liquid in the chamber 23 flows under a dip wall 38 and flows over an overflow wall 39 and passes into a heavy liquid outlet 40 connected to a suitable outlet pipe 33 extending through the pre-separator room and connected to the sewage system. An inclined plane 41 promoting the separation process is disposed at the bottom of the separator chamber 23. A chamber of the light liquid reservoir 31 is also located below the bottom of the heavy liquid outlet 40. A pipe 32 makes the connection between the light liquid balance room of which a further chamber 25 is disposed laterally from the separator chamber, wherein the above-mentioned dip tube 27 opens into this chamber, and the small flow opening (not shown) at the bottom of the heavy liquid outlet 40.

Furthermore, an overflow pipe 37 is provided emanating from the light liquid balance room and extending into a float chamber. A float 36 disposed there actuates the above-mentioned inlet closure 35 if a corresponding liquid level is reached.

The above-described separator operates in the same manner as the separator of FIGS. 5 and 6. Only the location of the light liquid balance room and the light liquid reservoir have been interchanged.

Figure 10:
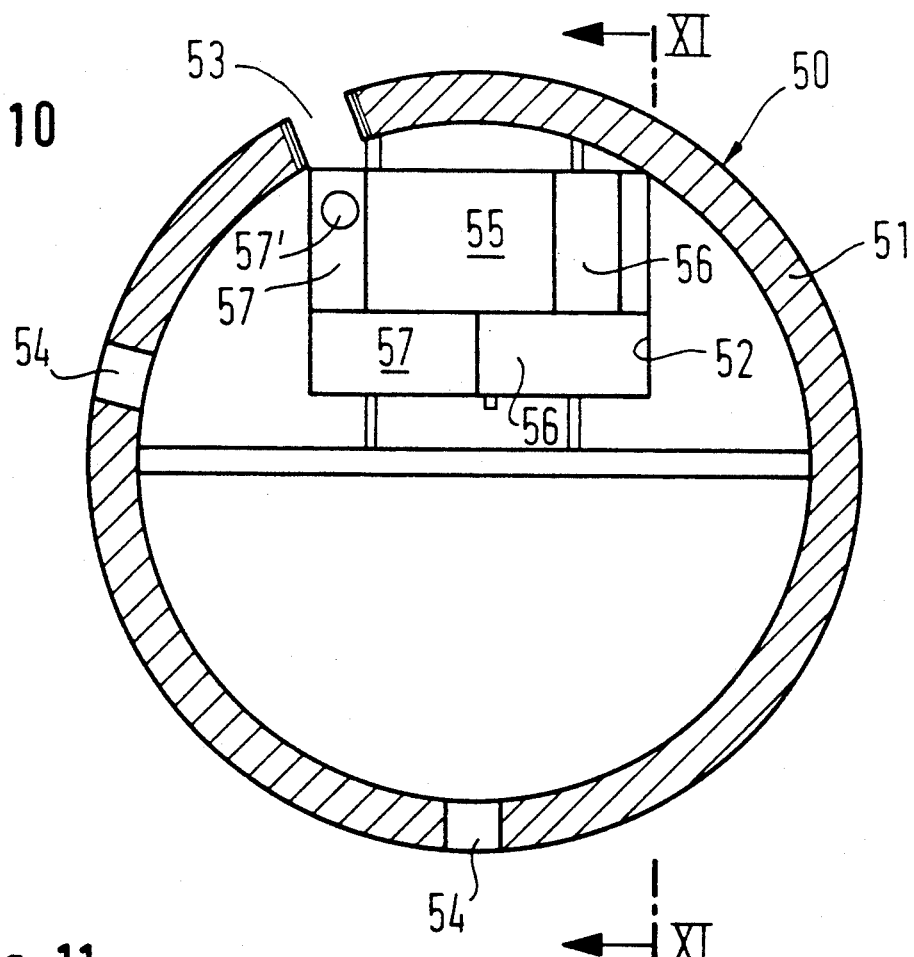
FIG. 10 is a top view of a fourth embodiment of light liquid separator having a cylindrically formed pre-separator room.
Figure 11:
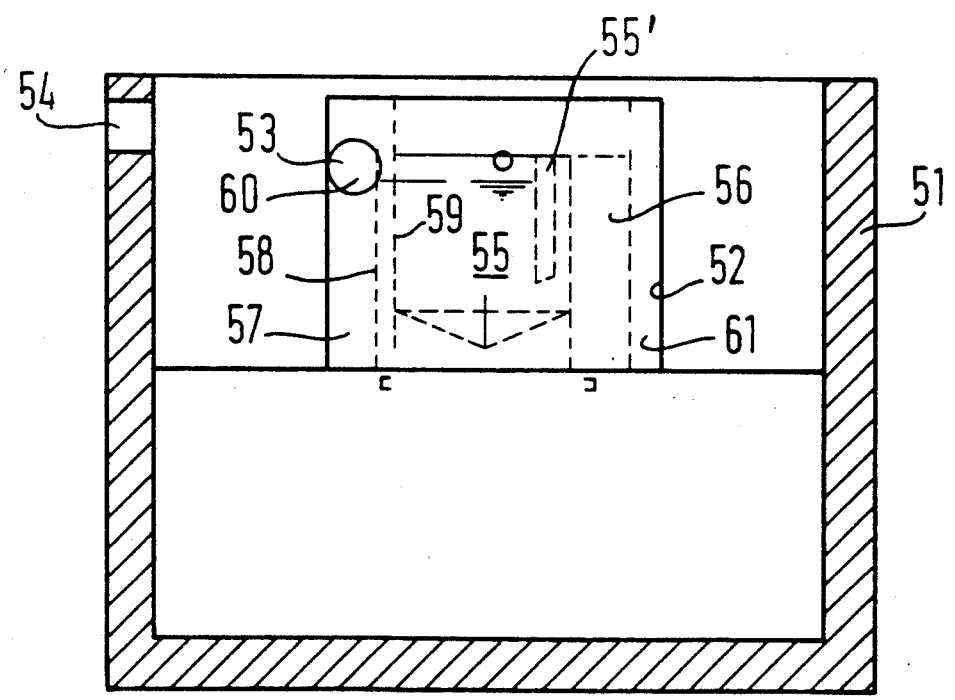
FIG. 11 is a sectional view of the separator along line 11 of FIG. 10.

According to the embodiment illustrated in FIGS. 10 and 11 a container 52 receiving the real separator chamber 55 is disposed in a round concrete container 51 forming a pre-separator room. The separator 50 has an inlet 54 laterally disposed in the figure as well as an optional inlet 54 disposed below in the figure. The heavy liquid outlet is shown at 53. The inflowing mixture is separated in the pre-separator room, and the heavy liquid taking along the remaining portion of the light liquid flows through the vertical inlet passage 61 into the real separator chamber 55 wherein it flows over a part of the light liquid reservoir 56. The remaining light liquid passes from the chamber 55 by means of a dip tube 55' into the light liquid balance room 57 into which also a dip tube 57' opens which is directly connected to the pre-separator room. The heavy liquid passes from the chamber 55 by flowing below a dip wall 59 and flowing over an overflow wall 58 to a heavy liquid outlet 53 which, as with all of the other embodiments, has a small flow opening 60 connected to the light liquid balance room 57 and causing the corresponding pump effects which result in a discharge of the light liquid into the light liquid reservoir 56. In other respects this separator operates in the same manner as the separator of the FIGS. 5 to 9.

In the following the operation of the inventive separator is again shortly commented on.

The lowered heavy liquid level corresponds to the height of the light liquid column above the heavy liquid level. The column above the lowered heavy liquid level corresponds to 10% of the total column if the light liquid has a specific weight of 0.90. With a specific weight of 0.80 the column above the lowered heavy liquid level corresponds to 20% of the total column.

The light liquid can only drain off below the lower edge of the dip tubes if the column over the heavy liquid level is somewhat exceeded (lowering slightly deeper or shorter pipe length according to prior examination of density). The dip tubes can be also disposed in an adjustable manner.

According to the above-described embodiments the light liquid can only drain off downwardly in the rest condition, i.e. without inflowing mixture. By the inflowing heavy liquid or the ascending heavy liquid level the light liquid can be only pressed upwardly.

Flowing heavy liquid does not exist in the separator. A flow is exceptionally present in the dip tubes itselves if at the beginning of the operation larger amounts of heavy liquid flow through the dip tubes and entrain the light liquid. However, this is only the case at the beginning of the operation. During the operation the whole light liquid swims on the higher located heavy liquid level while the inflow takes place thereunder.

Figure 12:
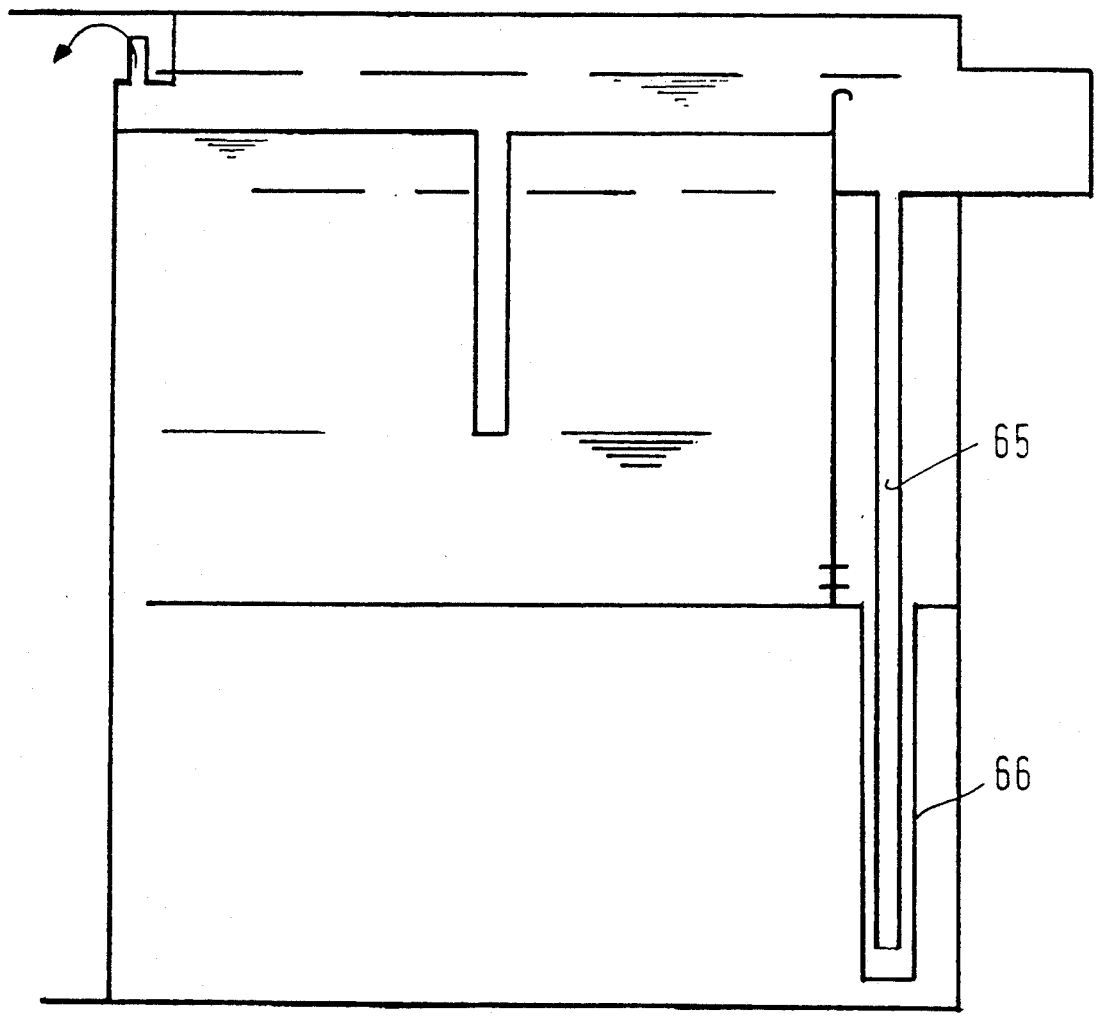
FIG. 12, is a sectional view of a separator with a sink dip tube.

FIG. 12 shows diagrammatically a section through a separator which is provided with a special sink dip tube 65. This dip tube 65 has the function to serve as safety device for such cases according to which an extremely high amount of light liquid flows in, for example at an oil accident. The probability that such an oil accident occurs immediately at the separator and has the result of an inflow of an exceedingly large amount of light liquid into the separator inlet is relatively low. Nevertheless, according to the invention corresponding measures have been provided in order to avoid environmental damages.

FIG. 12 shows, an additional sink dip tube 65 is provided. This dip tube has such a length that inflowing light liquid can never reach the depth of the dip tube. This is achieved by holding the light liquid column above the heavy liquid level so low that the light liquid cannot displace the heavy liquid up to this depth. The dip tube 65 extends into the pre-separator room (sludge chamber), wherein it passes through the light liquid balance container. A thicker pipe 66 extends from the light liquid balance container downwardly. This pipe is closed at its lower end and takes up the lower part of the sink dip tube 65.

I claim:

1. A light-liquid separator comprising:
   a housing provided with an inlet for a mixture including a heavy liquid and a light liquid;
   at least one separator chamber operatively connected with a heavy liquid outlet and formed along the path between said inlet and outlet of the housing, said chamber being provided with means forming an overflow edge located above a bottom of said heavy liquid outlet;
   a dip tube in said separator chamber extending downwardly from said overflow edge and having a respective inlet above said bottom of said heavy-liquid outlet for pre-separating said light liquid from said heavy liquid in said separator chamber;
   an underflow baffle positioned between said dip tube and said overflow edge;
   means forming a light liquid outlet and comprising:
     at least one light liquid balance room communicating with said separator chamber through said dip tube and receiving said light liquid and a part of said heavy liquid,
     a light liquid discharge reservoir, and
     a light liquid discharge tube means extending upwardly from said balance room into said reservoir, wherein said heavy liquid outlet is formed with a flow opening means located between said bottom and said inlet of the dip tube, for connecting said heavy liquid outlet to said balance room for discharging heavy liquid from said balance room.

2. The separator defined in claim 1 wherein said inlet of the dip tube is located below said inlet of the mixture.

3. The separator defined in claim 1 wherein said light liquid balance room is formed within said separator chamber, said separator chamber being formed with a top wall, said dip tube extending downwardly from and said light liquid discharge tube extending upwardly from said top wall.

4. The separator defined in claim 1 wherein said light liquid balance room is adjacent said underflow baffle.

5. The separator defined in claim 1 wherein said reservoir is formed downstream of said light liquid balance room.

6. The separator defined in claim 1 wherein said housing is further formed with a pre-separator coarse sludge chamber located upstream of said separator chamber, said coarse chamber being operatively connected with said separator chamber by an overflow wall.

7. The separator defined in claim 6 wherein said coarse chamber is provided with a second dip tube communicating with said light liquid balance room.

8. The separator defined in claim 6, wherein said separator chamber and said light liquid balance room are housed in a container operatively connected with said heavy liquid outlet, said container being mounted within said pre-separator coarse chamber communicating with said mixture inlet.

9. The separator defined in claim 8 wherein said inlet being a pipe including a generally horizontal section and a section extending angularly downwardly into said pre-separator chamber.

10. The separator defined in claim 8 wherein said separator chamber is formed with a bottom provided with an opening extending over a width thereof for evacuating a part of said heavy liquid from said chamber.

11. The separator defined in claim 8 wherein said container includes a plurality of light liquid balance room chambers, said plurality of light liquid balance room chambers being located downstream of said separator chamber.

12. The separator defined in claim 8 wherein the light liquid balance room of said light liquid outlet projects laterally from said container including said separator chamber and is covered by a top wall receiving a second dip tube from said pre-separator chamber extending into said light liquid balance room.

13. The separator defined in claim 12 wherein said separator chamber is formed with a bulge portion, the dip tube of said separator chamber being mounted in said bulged portion, said separator chamber being located above said top wall of said light liquid balance room.

14. The separator defined in claim 6 wherein said separator chamber is formed with a sink tube formed with a closed lower end terminating below the bottom of the separator chamber at a distance from a bottom of said housing, said light liquid room being formed with a balance tube means for taking up an excessive amount of said light liquid and extending downwardly therefrom into the sink tube of said separator chamber, said balance tube being formed with an open bottom communicating with the separator chamber and receiving the heavy liquid therefrom, so that said excessive amount of said light liquid is balanced by the heavy liquid entering the open bottom of said balance tube.

* * * * *